United States Patent [19]
Kim et al.

[11] Patent Number: 5,809,027
[45] Date of Patent: Sep. 15, 1998

[54] ARBITRATION SWITCHING SYSTEM AND A METHOD OF ARBITRATION SWITCHING IN A HIGH-SPEED PACKET SWITCHING SYSTEM WITH A PARALLEL COMMON BUS TYPE

[75] Inventors: Dong Won Kim; Won Ryu; Dae Ung Kim, all of Daejeon, Rep. of Korea

[73] Assignee: Electronics & Telecommunications Research Institute, Daejeon, Rep. of Korea

[21] Appl. No.: 685,571

[22] Filed: Jul. 24, 1996

[30] Foreign Application Priority Data

Jul. 24, 1995 [KR] Rep. of Korea .................. 1995-21929

[51] Int. Cl.$^6$ ................................................. H04L 12/00
[52] U.S. Cl. ........................................... 370/451; 370/462
[58] Field of Search ..................................... 370/449, 450, 370/451, 452, 453, 454, 455, 456, 461, 462, 389, 402, 403; 395/287, 296, 306, 308, 311, 800.01; 364/240, 240.1, 242.6, 242.92

[56] References Cited

U.S. PATENT DOCUMENTS

| | | | |
|---|---|---|---|
| 4,569,044 | 2/1986 | Tao et al. | 370/451 |
| 4,573,120 | 2/1986 | Ishimiya et al. | 395/821 |
| 5,115,430 | 5/1992 | Hahne | 370/440 |
| 5,282,198 | 1/1994 | Punj | 370/440 |
| 5,434,861 | 7/1995 | Pritty et al. | 370/449 |
| 5,479,395 | 12/1995 | Goodman et al. | 370/461 |
| 5,504,749 | 4/1996 | Cheon | 370/389 |
| 5,590,130 | 12/1996 | Krein et al. | 370/462 |

FOREIGN PATENT DOCUMENTS 0405042  6/1989  European Pat. Off. .

Primary Examiner—Alpus H. Hsu
Assistant Examiner—Kwang B. Yao
Attorney, Agent, or Firm—Nixon & Vanderhye, PC

[57] ABSTRACT

An arbitration switching system and a method of arbitration switching in a high-speed packet switching system uses a subscriber input/output device, an arbitration switching system and a parallel common bus part for the purpose of point-to-point communication point-to-multipoint communication and transferring packets generated in each node. A system bus structure is based on a parallel common bus type. Furthermore, to accommodate high-speed arbitration switching, operations such as polling, arbitration and switching are processed in parallel. Therefore, bus use efficiency is high, and a bus-extension can be easily achieved. A star LAN may be realized because broadcasting and multicasting are supported. An internal high-speed network for interlock in large-scaled communication systems that need high-speed switching can also be provided.

14 Claims, 7 Drawing Sheets

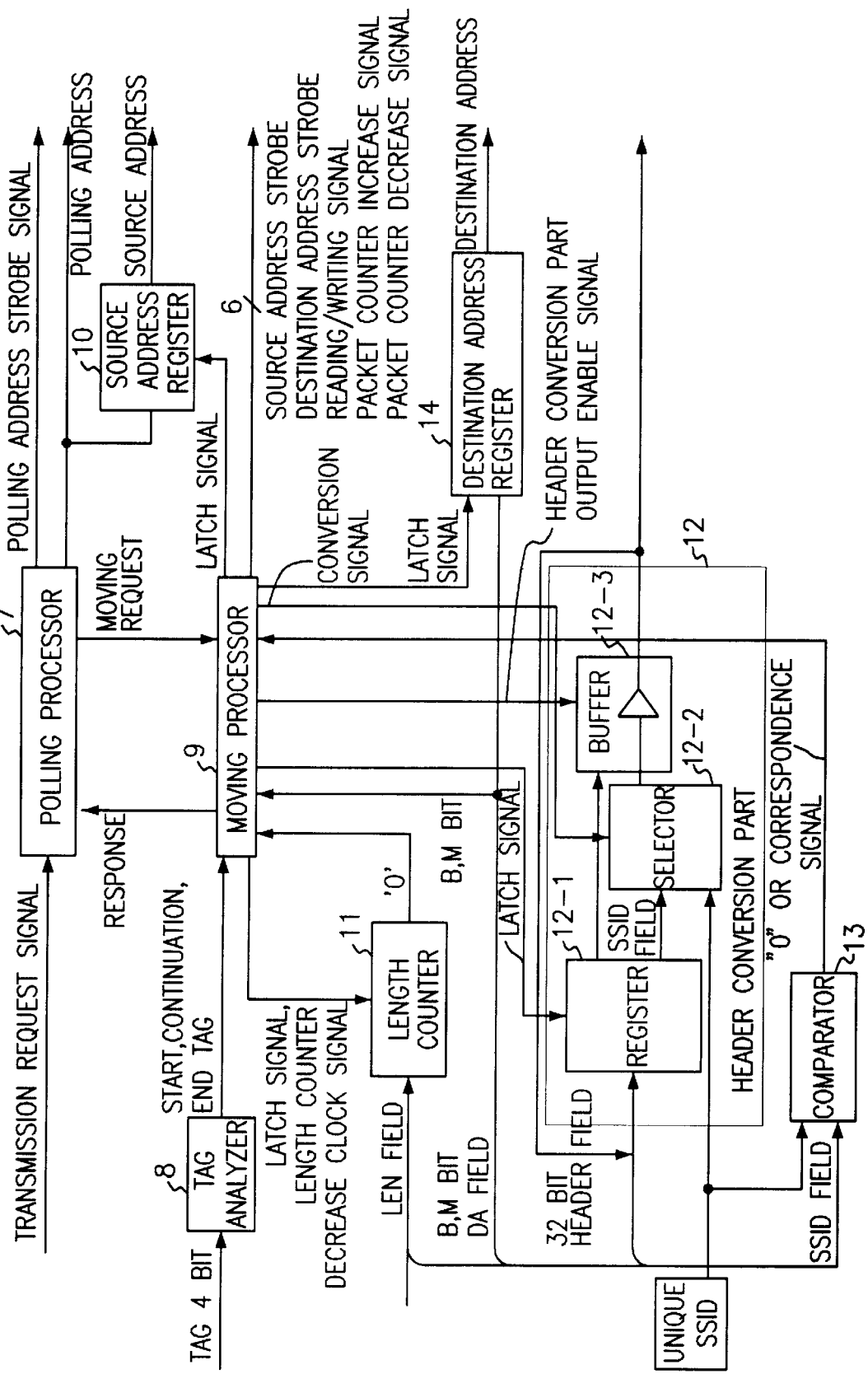

FIG. 5(a)
POLLING ADDRESS
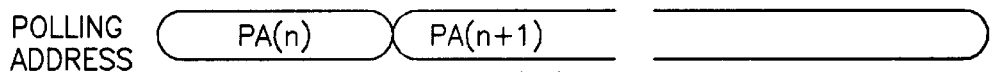

FIG. 5(b)
SOURCE ADDRESS
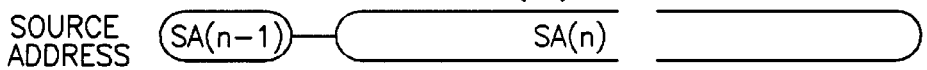

FIG. 5(c)
DESTINATION ADDRESS
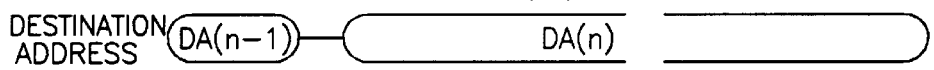

FIG. 5(d)
READ

FIG. 5(e)
WRITE

FIG. 5(f)
SOURCE INPUT/OUTPUT PART OUTPUT / HEADER CONVERSION PART OUTPUT
DATA
TAG
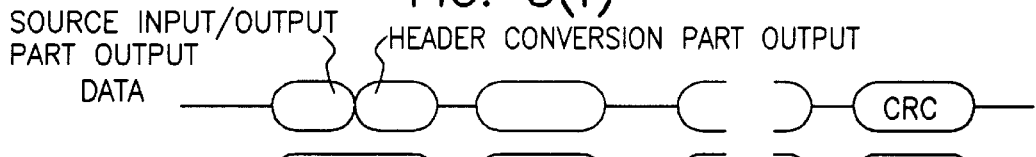

FIG. 5(g)
LENGTH COUNTER
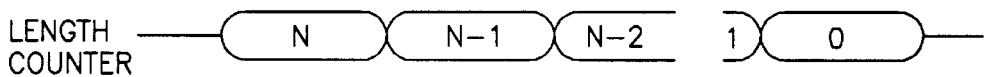

FIG. 5(h)
SOURCE AS
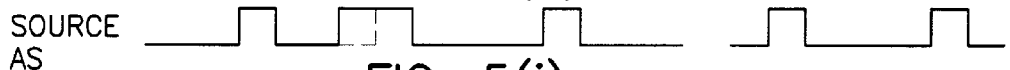

FIG. 5(i)
DESTINATION AS
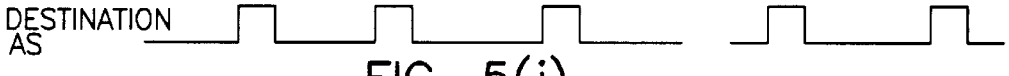

FIG. 5(j)
HEADER CONVERSION PART OUTPUT ENABLE
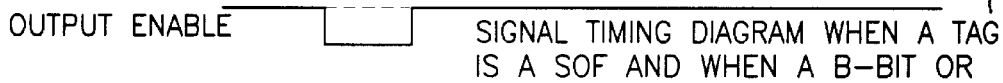

SIGNAL TIMING DIAGRAM WHEN A TAG IS A SOF AND WHEN A B-BIT OR AN M-MIT IS SET.

FIG. 5(k)
HEADER CONVERSION SIGNAL
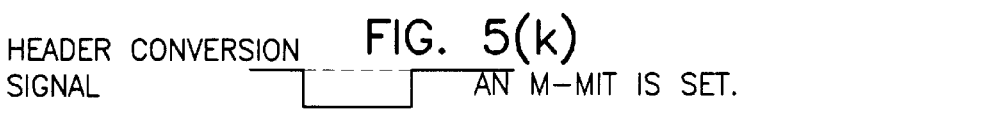

ARBITRATION AND HEADER PROCESS ◄──► DATA TRANSFER

--- : POINT-TO-POINT COMMUNICATION

ARBITRATION SWITCHING SYSTEM AND A METHOD OF ARBITRATION SWITCHING IN A HIGH-SPEED PACKET SWITCHING SYSTEM WITH A PARALLEL COMMON BUS TYPE

BACKGROUND OF THE INVENTION

1. Field of the Invention

The present invention relates to an arbitration switching system and a method of arbitration switching in a high-speed packet switching system, and more particularly in a high-speed packet switching system which consists of a subscriber input/output device, an arbitration switching system and a parallel common bus part for the purpose of point-to-point communication, point-to-multipoint communication and transferring packets generated in each node.

2. Description of the Prior Art

Conventional packet switching or message switching uses a low-speed LAN (Local Area Network) technique such as Token-Ring of serial connection type, Ethernet of serial bus type and Token-Bus, etc., and uses a high-speed FDDI (Fiber Distributed Data Interface) technique using fiber optics. Also, tightly-coupled common memory communication or common system bus techniques can be applied to a parallel computer and a small-sized packet switching system.

Of all of the above methods, LAN and MAN (Metropolitan Area Network) are expensive compared with their performance (less than about 100 Mbps) because they adopt a more or less complicated media access communication protocol for communication between closely distributed nodes. On the contrary, the method of tightly-coupled common memory communication or common system bus takes a long arbitration time since the right to use is given after arbitrating request/acknowledgement/recognition. Therefore, a common medium is not well utilized, and the number of accommodated nodes is small. Furthermore, since such methods have a back plane mounting scale within a shelf, it is impossible to accommodate closely distributed nodes.

SUMMARY OF THE INVENTION

It is an object of the present invention to provide an arbitration switching system and a method for arbitration in high-speed packet switching system with parallel common bus type, wherein an arbitration is accomplished by a polling method, and high-speed (320 Mbps) performance can be obtained by using a relatively simple media access protocol for transfering data by way of a parallel common bus. When arbitrating the right to use a common bus, bus usage efficiency is high because both polling and data transmission is processed in parallel. Furthermore, broadcasting and multicasting as well as point-to-point communication are obtained by analyzing a packet header, and extension up to 192 nodes is allowable.

In accordance with one aspect of the present invention, an arbitration switching system in a high-speed packet switching system with a parallel common bus type includes:

polling processing means for outputting a moving request signal after receiving a transmission request signal, and for outputting a polling AS (Address Strobe) signal and a polling address after receiving a response signal responsive to a moving request;

tag analyzing means for outputting a signal representing start/continuation/end state after receiving a tag signal from outside;

length counting means for latching an LEN bit which is transmitted from outside according to a latch signal, and for outputting a counter value which is decreased according to a length counter decrease clock signal;

header conversion means for writing its unique SSID on SSID bits by means of a conversion signal after latching a header field by a latch signal in case B bit and M bit are set, and for outputting a converted header data to the outside and the self;

comparing means for comparing an SSID field transmitted from outside with its unique SSID;

a destination address register for outputting a destination address by latching B bit, M bit and DA bit transmitted from outside according a latch signal;

a source address register for transmitting a source address to outside by latching a polling address transmitted from said polling processing means with the help of a latch signal; and moving processing means for outputting a control signal which is used for controlling header conversion and data transmission.

In the method of an arbitration switching system in high-speed packet switching system with parallel common bus type, the method includes the following steps of:

a first step to output a moving request signal to said moving processing means after initializing a polling address value of polling processing means as 0, and generating a polling address strobe (AS) signal;

a second step to generate a source address latch signal, output a response signal to said polling processing means, and detect the state of an applied tag value after outputting a source AS signal and a reading signal in case said moving processing means receives a moving request signal from said polling processing means;

a third step to process a packet header in case a tag value corresponds to a start frame;

a fourth step to operate a packet transfer switching in case a tag value corresponds to a continuation frame; and a fifth step to terminate a packet transfer process in case a tag value corresponds to a end frame.

BRIEF DESCRIPTION OF THE ATTACHED DRAWINGS

FIG. 4 shows a construction of an arbitration switching system in accordance with the present invention;

Figure 6A:
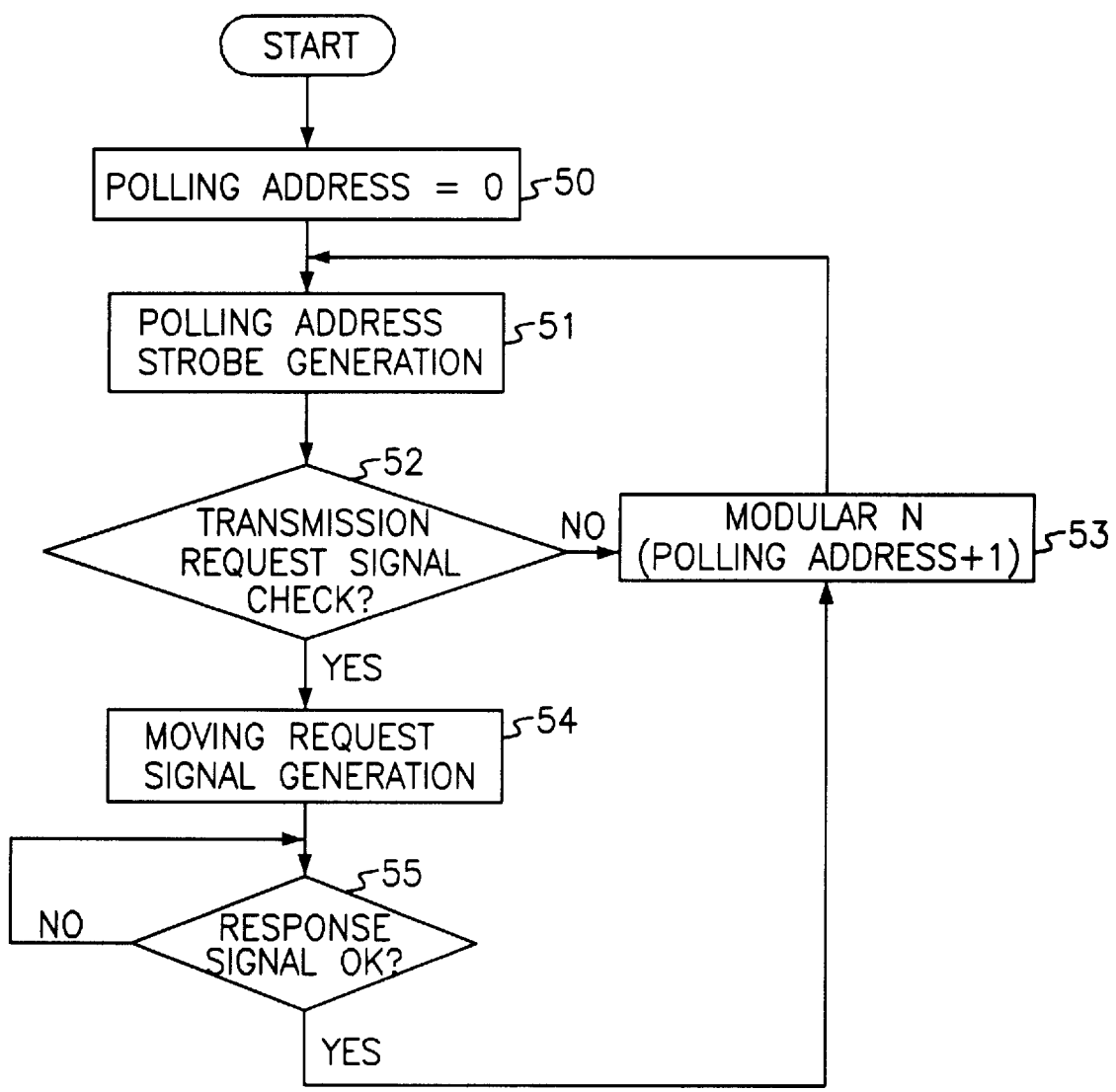
Figure 6B:
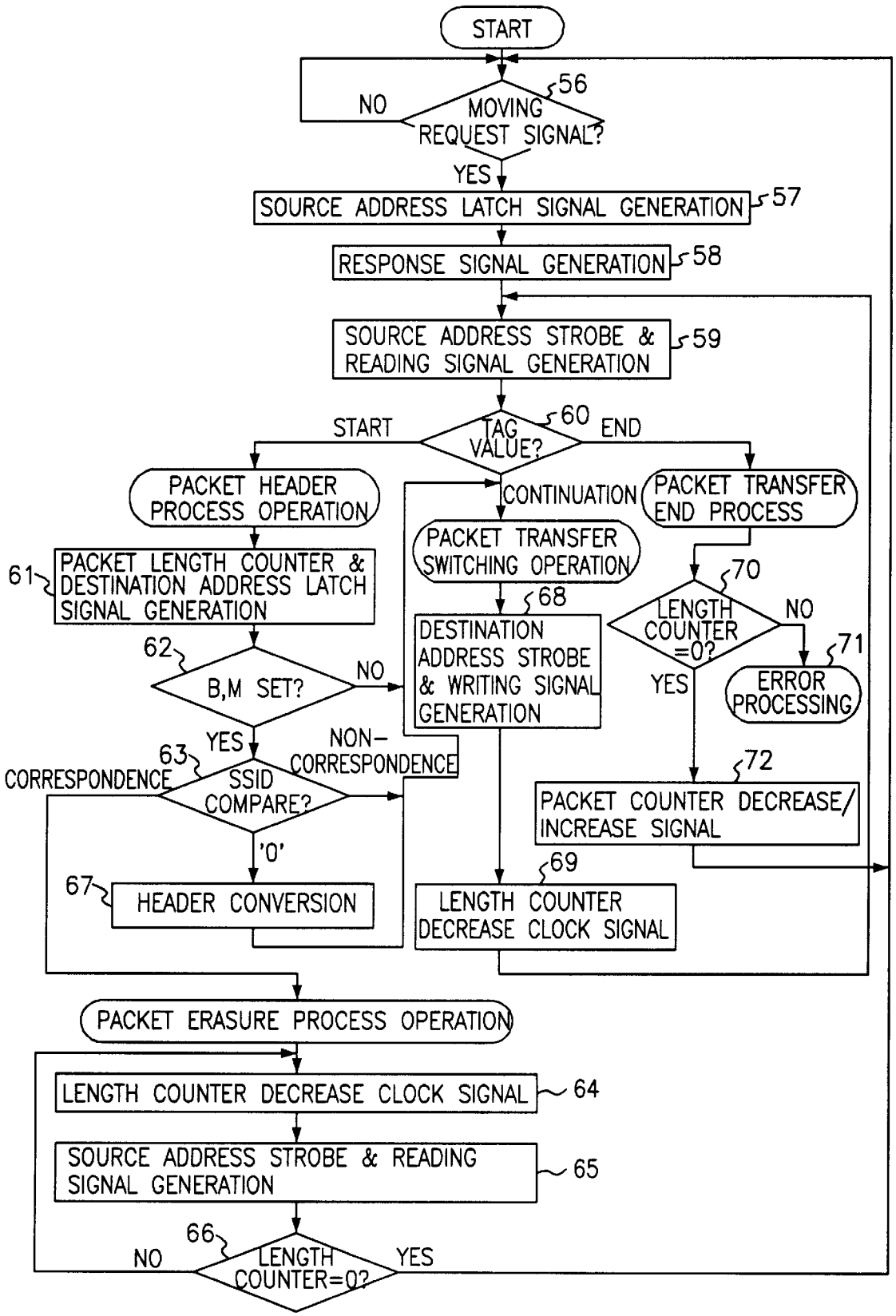

FIGS. 5(a)–5(k) show an operational timing diagram in accordance with the present invention; and FIGS. 6(A)–6(B) show an overall flow-chart in accordance with the present invention.

DETAILED DESCRIPTION OF THE PREFERRED EMBODIMENT

Referring to the attached drawings, the preferred embodiment of the present invention will be fully explained.

Figure 1:
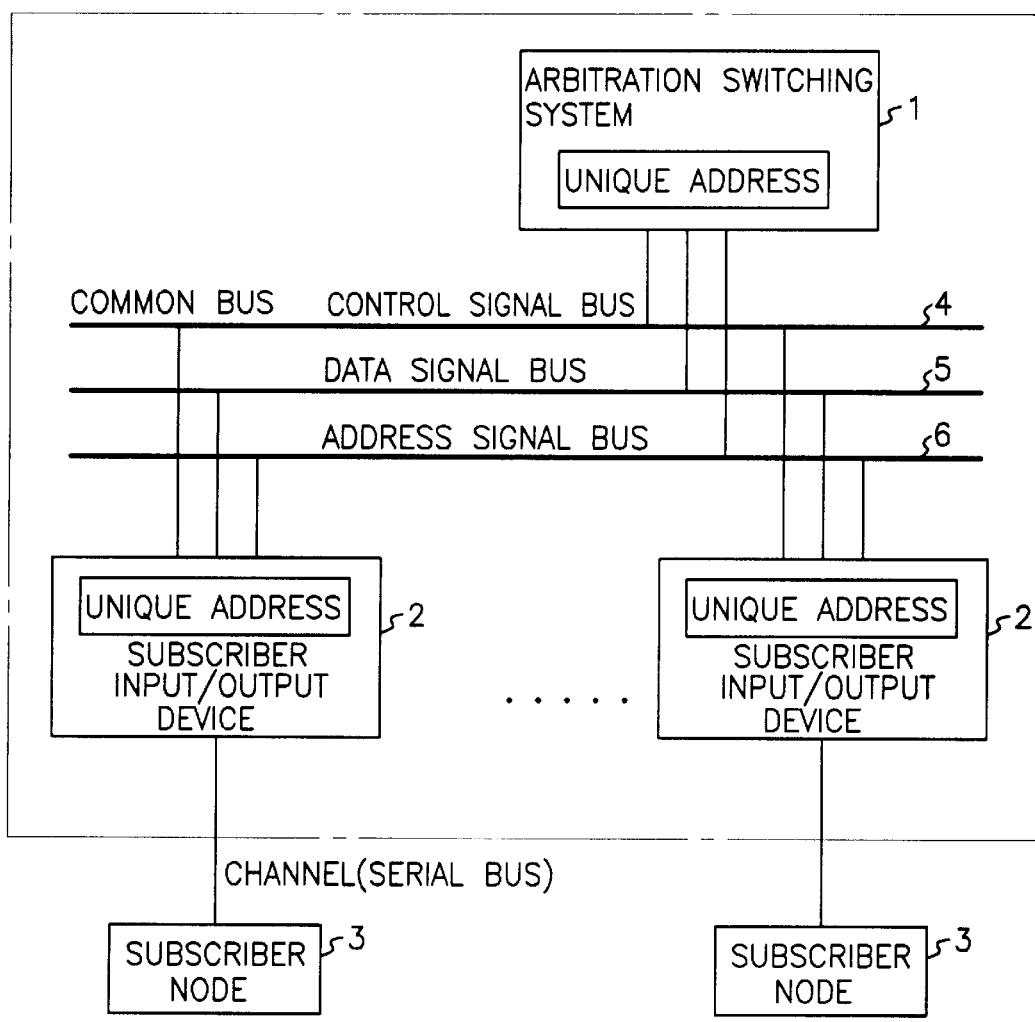
FIG. 1 shows an overall construction of a high-speed packet switching system with a parallel common bus type.

FIG. 1 shows the overall construction of a high-speed packet switching system with a parallel common bus, wherein 1 represents an arbitration switching system, 2 a subscriber input/output device, 3 a subscriber node, 4 a control signal bus, 5 a data signal bus, and 6 an address signal bus, respectively. Also, all of 4, 5 and 6 denote a common bus.

A high-speed packet switching system with a parallel common bus is composed of 3 main functional parts, that is, a subscriber input/output device 2, an arbitration switching system 1 and a parallel common bus.

Subscriber input/output device 2, serially connected to each subscriber node, is responsible for input and output of a data packet.

Arbitration switching system 1 is responsible for transferring packet data and arbitrating the right to use a parallel common bus.

In addition, said parallel common bus, corresponding to a common medium for said subscriber input/output device 2, is composed of a data signal bus 5 for an actual path of packet data, a control signal bus 4, and an address signal bus 6.

Arbitration switching system 1 has a 2-bit allocated unique address, i.e., a system ID, representing an address of a packet switching system as well as an ID (Identification) of an arbitration switching system.

On the contrary, said subscriber input/output device 2 has a 6-bit allocated unique address, i.e., a subscriber input/output device ID in order to accept 64 channels per arbitration switching system 1. Therefore, in case 3 arbitration switching systems are linked all together, 192 channels can be accepted, and each of them is assigned to its unique address representing a system ID and a subscriber input/output device ID.

Figure 2:
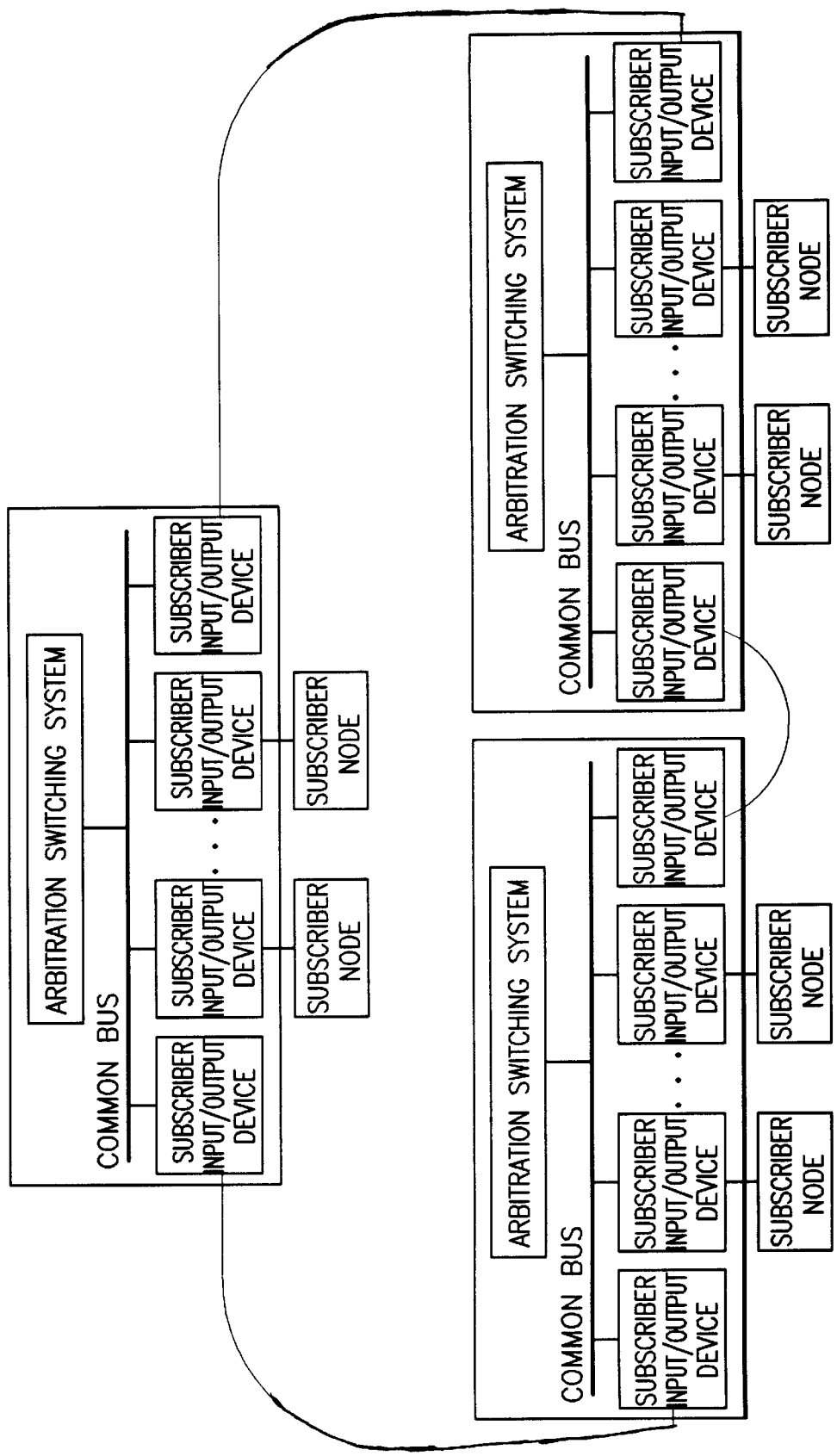
FIG. 2 shows a linkage among several high-speed packet switching systems with a parallel common bus type.

FIG. 2 shows a linkage among several high-speed packet switching systems with a parallel common bus type, wherein the linkage can be accomplished by connecting a subscriber input/output device 2 whithin one arbitration switching system 1 to a subscriber input/output device 2 whithin another arbitration switching system 1.

In a linkage structure, an arbitration switching system 1 within a subscriber input/output device 2 which receives packet data for a broadcasting and multicasting corresponds to a source arbitration switching system. Hence, a source arbitration switching system ID represents a source system ID.

Figure 3:
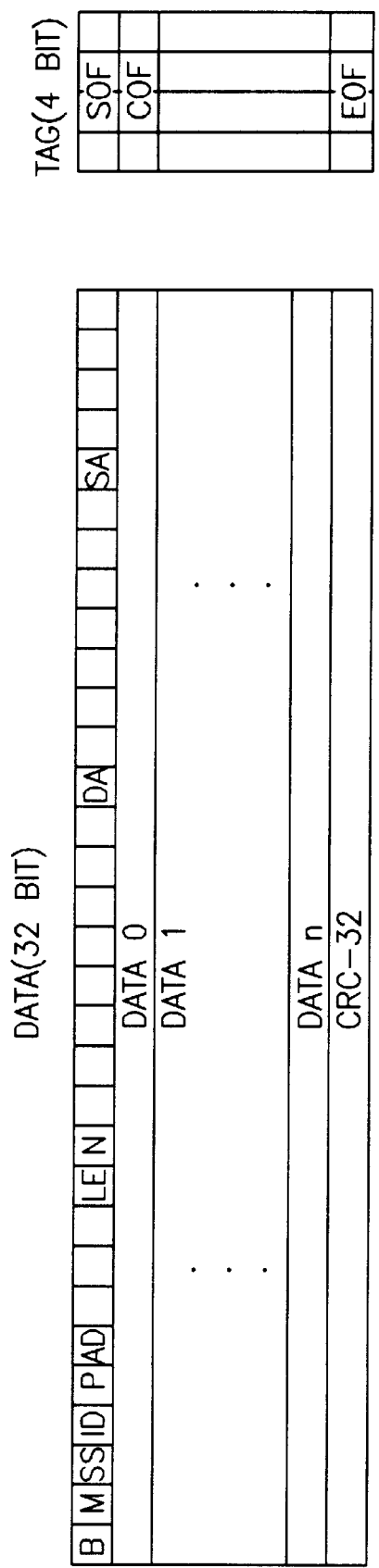
FIG. 3 shows a packet format and a construction of a header field.

FIG. 3 shows a packet format and a construction of a header field, wherein a packet consists of 32-bit data and a 4-bit tag.

Said 32-bit data is composed of a header field, a plurality of 32-bit data field and an CRC-32 (Cyclic Redundancy Code) for detecting an error.

In the meantime, said header field includes:

an 1-bit B bit for representing a broadcasting signal;
an 1-bit M bit for representing a multicasting signal;
a source system ID for being set as 0 by a source subscriber input/output device in case B bit or M bit is set, and for being written with a system ID by said arbitration switching system 1;
PAD (Padding byte count) for indicating how many bytes should be added in order to set a packet length as a multiple of 4 unless a packet length is a multiple of 4;
LEN for representing a whole packet length with the number of byte; DA (Destination Address) for representing a destination address, or for representing a group address in case an M bit is set; and
SA (Source Address) for representing a source address.

Meanwhile, said 4-bit tag consists of SOF (Start of Frame), COF (Continuation of Frame) and EOF (End of Frame).

FIG. 4 shows a construction of an arbitration switching system 1 in accordance with the present invention, wherein said arbitration switching system 1 is responsible for detecting a state of each subscriber input/output device, for a polling arbitration function in order to arbitrate the right to use a bus, for analyzing a packet header, and for switching and transferring data.

An arbitration switching system 1 in high-speed packet switching system with parallel common bus type includes:

a polling processor 7 for outputting a moving request signal after receiving a transmission request signal, and for outputting a polling AS (Address Strobe) signal and a polling address after receiving a response signal responsive to a moving request;
a tag analyzer 8 for outputting a signal representing start/continuation/end state of tag after receiving a tag signal from outside;
a length counter 11 for latching LEN bit which is transmitted from outside accoding to a latch signal, and for outputting a counter value which is decreased according to a length counter decrease clock signal;
a header conversion part 12 for writing its unique SSID on SSID bits by means of a conversion signal after latching a header field by a latch signal in case B bit and M bit are set, and for outputting a converted header data to the outside and the self;
a comparator 13 for comparing an SSID field transmitted from outside with its unique SSID;
a destination address register 14 for outputting a destination address by latching B bit, M bit and DA bit transmitted from outside according a latch signal;
a source address register 10 for transmitting a source address to outside by latching a polling address transmitted from said polling processing means with the help of a latch signal; and
a moving processor 9 having the following operations of:
   outputting a latch signal to said source address register 10 after receiving a moving request signal from said polling processor 7, also outputting a response signal to said polling processor 7;
   outputting a latch signal to said length counter 11 and said destination address register 14 after receiving a tag signal of start/continuation/end from said tag analyzer 8, also receiving a counter value after outputting a decrease clock signal to said length counter 11;
   outputting a latch signal to said header conversion part 12 when an applied B or M bit is set, also outputting a converted signal to said header conversion part 12 and a non-activated source AS signal to a source subscriber input/output device, respectively, after receiving the output of said comparator 13; and
   outputting output enable signal to said header conversion part 12, also outputting a source AS signal, a destination AS signal, a reading/writing signal and a packet counter increase/decrease signal to said subscriber input/output device 2.

In the meantime, said header conversion part 12 includes:
a register 12-1 for latching a 32-bit header field of by a latch signal from said moving processor 9 in case of a multicasting or a broadcasting;
a selector 12-2 for writing its unique SSID bit on an SSID field within a header field by a conversion signal from said moving processor after receiving a latched header field; and a buffer part 12-3 for outputting a converted header field to a data bus by an output enable signal, and making a feedback process.

Of switching transfer operations, a point-to-point communication has one destination. In a broadcasting, all subscriber input/output devices 2 within an arbitration switching system 1 are a destination. Also, in a multicasting, a specific group of subscriber input/output devices 2 are a destination.

In a point-to-point communication, a B bit or an M bit is not set, and a DA bit represents a destination address.

In a broadcasting, a B bit is set, and an M bit is not set. In this case, a DA bit comes to be ignored, on the contrary, a B bit of a destination address becomes activated. A subscriber node 3 should transmit a packet after setting a B bit of a packet header and initializing an SSID bit as 0 in order to accomplish a broadcasting process.

In a single packet switching system, a broadcasting transaction is accomplished in all subscriber input/output devices 2. In a linkage structure, an arbitration switching system 1 including a subscriber input/output device which received a broadcasting packet is a source arbitration switching system, and its ID is called a source system ID (SSID).

In case of a multicasting, an M bit of a packet header is set, and a B bit is not set. A multicasting operation is the same as a broadcasting operation. However, a DA field represents a group address instead of a destination address, and follows a method of analyzing a group address.

Referring to FIG. 5, the overall operation of said arbitration switching system 1 will be fully explained in view of a timing.

Said polling processor 7 takes a role in checking as to whether or not a request signal is generated from each subscriber input/output device 2 while sequentially generating a polling signal as shown in FIG. 5(*a*). In case any subscriber input/output device 2 is activated by a request signal, said polling processor 7 outputs a moving request signal to said moving processor 9. Whenever a moving service is available, said moving processor 9 outputs a response signal to said polling processor 7. Meanwhile, said polling processor 7 outputs a source address as shown in FIG. 5(*b*) after latching a polling address, at the point of outputting a response signal, into said source address register 10 by means of a latch signal from said moving processor 9.

When said polling processor 7 receives a response signal, it continues to check polling, i.e., to check as to whether a next request signal is generated from said subscriber input/output device 2. Said polling processor 7 is composed of SAM448 sequencer.

Said moving processor 9 makes a source AS signal, which represents the effectiveness of activating a latched source address. Simultaneously, said moving processor 9 outputs a reading signal shown in FIG. 5(*d*) to a common bus. At this time, a packet data is read through a common bus from said subscriber input/output device 2 which is selected as a source. A 4-byte data and 4-bit tag are regarded as a packet header information, and are analyzed in said tag analyzer 8.

After detecting a start/continuation/end of a frame, said tag analyzer 8 notifies said moving processor 9 of its result. In case, the result is a start of a frame, said moving processor 9 outputs a latch signal to said length counter 11 and said destination address register 14. Then, said moving processor 9 enables said length counter 11 to latch LEN bits, enables said destination address register 14 to latch a B bit, M bit and DA bit, and then outputs a destination address to which data should be outputted shown in FIG. 5(*c*).

Unless a B bit or M bit is set, said moving processor 9 transfers data to a destination address represented by a DA bit. In case a B bit or M bit is set, said moving processor 9 latches a packet header within said register 12-1 by outputting a latch signal to a header conversion part 12.

Meanwhile, said comparator 13 compares SSID bits with its unique SSID, and then outputs the result to said moving processor 9. In case an output of said comparator 13 is 0, said moving processor 9 outputs a conversion signal to said selector 12-2 of a header conversion part 12, and then writes its unique SSID on an SSID field.

In case an output of said comparator indicates that the above compared values are not equal to each other, a packet transfer process is accomplished since the system which received a packet is not a source system. In case the above compared values are equal to each other, a packet erasure process follows since a broadcasting or a multicasting is finished.

When a header conversion signal shown in FIG. 5(*k*) is generated, said moving processor 9 makes a source AS signal shown in FIG. 5(*h*), which is being outputted to said source subscriber input/output device 2, non-activated, and said source subscriber input/output device 2 blocks an output of a header data which is being outputted to a data bus.

At this time, a header conversion part output enable signal shown in FIG. 5(*h*) is activated by said moving processor 9. Also, information which is latched in said header conversion part 12 and information which passed through said selector 12-2 are outputted to a data bus, and then transferred to said destination subscriber input/output device 2.

A packet erasure operation is accomplished by reading as much as a packet length by means of a reading signal and a source AS signal without generating a writing signal.

Meanwhile, a packet transfer operation is assomplished as follows: data, which are read by a source AS signal and a reading signal, are outputted to a selected destination subscriber input/output device by means of a destination AS signal and a writing signal generated by said moving processor 9. This transfer operation is accomplished by generating a counter decrease clock signal shown in FIG. 5(*g*) to said length counter 11 which latches a LEN bit of a packet header, and this process continues repeatedly until a counter value comes to be 0 after receiving an output of said length counter.

In case a counter value is 0, it can be said that a packet is completely moved. After said tag analyzer 8 checks with an EOF (End of Frame) signal, a packet counter increase/decrease signal is outputted to said subscriber input/output device 2 in case the result indicates a correspondence. In case the result indicates a non-correspondence, an error process follows because it is regarded that an error took palce.

FIG. 6 shows an overall flow-chart in accordance with the present invention.

At first, a polling address of said polling process 7 is initialized as "0" (step 50). Then, after generating a polling AS signal (step 51), whether or not a transmission request signal from said subscriber input/output device 2 is generated is sequentially checked (step 52). In case a transmission request signal is not generated, the step 51 is repeated after increasing a value of a polling address (step 53). In case of detecting a transmission request signal, a moving request signal is outputted to said moving processor 9 (step 54).

Then, in case of receiving a response signal from said moving processor 9, the step 51 is repeated after increasing a value of a polling address (step 55).

When said moving processor 9 receives a moving request signal (step 56), said moving processor 9 generates a source address latch signal and outputs it to said source address register 10 (step 57). Also, after outputting a response signal to said polling processor 7 (step 58), data is read from said subscriber input/output device 2, which is requesting a transmission, by generating a source AS signal and a reading signal (step 59).

A 4-bit tag signal of applied 32-bit input data is analyzed in said tag analyzer 8, and the result is inputted to said moving processor 9 in order to check the state of an applied tag signal (step 60).

In case the state is an SOF (Start of Frame), said moving processor 9 operates a packet header process which is followed by the following steps: a latch signal is outputted to said length counter 11 and said destination address register 14 (step 61); whether a B bit or an M bit is set is checked (step 62); in case a B bit or an M bit is set, an SSID bit is applied from said comparator 13 (step 63); and in case an SSID bit is 0 which represents an initializing state for a multicasting or a broadcasting, its unique SSID value is written on an SSID bit (step 67) by means of outputting a conversion signal to said header conversion part 12.

In case said step 63 indicates a correspondence signal, a packet erasure process follows since a broadcasting or a multicasting is completely finished. In the meantime, the packet erasure process is followed by the following steps: a length counter decrease clock signal is outputted to said length counter 11 (step 64); a source AS signal and a reading signal are outputted (step 65); and then, an output of said length counter 11 is checked (step 66).

In case an output is 0, said step 56 is repeated since the packet erasure process is completely finished. On the contrary, in case an output is not 0, said step 64 is repeated.

Also, a packet transfer switching process takes place when a B bit or an M bit is not set, when an SSID bit is not equal to its unique SSID bit, when a header conversion process is already accomplished or when an analyzed tag indicates a COF (Continuation of Frame).

A packet transfer switching process is followed by the following steps: a destination AS signal and a writing signal are outputted to a common bus (step 68); and a length counter decrease clock signal is outputted to said length counter 11 (step 69).

Then, said step 59 is repeated until a tag representing an EOF (End of Frame) is applied.

When a tag representing an EOF (End of Frame) is applied, a packet transfer end process takes place, including the following steps: whether or not a value of said length counter 11 is 0 is checked (step 70); in case a checked value is not 0, an error is processed (step 71); and in case a checked value is 0, a packet counter increase/decrease signal is outputted to said subscriber input/output device (step 72). Then, said step 56 is repeated.

As described above, the present invention has a system bus structure based on a parallel common bus type. Furthermore, due to a high-speed arbitration switching system, an operation such as polling, arbitration and switching is processed in parallel. Therefore, an efficiency of using a bus is high, and an extension of bus can be easily achieved. Also, the present invention is applied to a star LAN because of supporting a broadcasting and a multicasting, or an internal high-speed network for interlock in large-scaled communication systems that need a high-speed switching.

What is claimed:

1. An arbitration switching system in a high-speed packet switching system with a parallel common bus type, comprising:

polling processing means for outputting a moving request signal after receiving a transmission request signal, and for outputting a polling AS (Address Strobe) signal and a polling address after receiving a response signal responsive to a moving request;

tag analyzing means for outputting a signal representing start/continuation/end state of tag after receiving a tag signal from outside;

length counting means for latching LEN bit which is transmitted from outside accoding to a latch signal, and for outputting a counter value which is decreased according to a length counter decrease clock signal;

header conversion means for writing its unique SSID on SSID bits by means of a conversion signal after latching a header field by a latch signal in case B bit and M bit are set, and for outputting a converted header data to the outside;

comparing means for comparing an SSID field transmitted from outside with its unique SSID;

destination address register for outputting a destination address by latching B bit, M bit and DA bit transmitted from outside according a latch signal;

source address register for transmitting a source address to outside by latching a polling address transmitted from said polling processing means with the help of a latch signal; and moving processing means for outputting a control signal which is used for controlling header conversion and data transmission.

2. An arbitration switching system in a high-speed packet switching system with a parallel common bus type as claimed in claim 1, wherein said header conversion means comprising:

a register for latching a header field of data applied from the outside with the help of a latch signal of said moving processing means in case of a multicasting or a broadcasting;

a selecting means for writing its unique SSID bit on an SSID field within a header field by a conversion signal from said moving processing means after receiving a header field which is latched in said register; and a buffering means for outputting a converted header field to the outside by a header conversion part output enable signal of said moving processing means, and making a feedback process.

3. A method of operating an arbitration switching system in a high-speed packet switching system with a parallel common bus, said method comprising the steps of:

(a) outputting a moving request signal to a moving processing means after initializing a polling address value of polling processing means as 0, and generating a polling address strobe (AS) signal;

(b) generating a source address latch signal, outputting a response signal to said polling processing means, and detecting the state of an applied tag value after outputting a source AS signal and a reading signal in case said moving processing means receives a moving request signal from said polling processing means;

(c) processing a packet header in case a tag value corresponds to a start frame;

(d) effecting packet transfer switching in case a tag value corresponds to a continuation frame; and (e) terminating packet transfer in case a tag value corresponds to an end frame, wherein said step (a) comprises:
(i) initializing a polling address of said polling processing means as zero, and checking whether or not a transmission request signal from a subscriber input/output device is generated;
(ii) repeating step (b) of generating a polling AS signal by increasing a value of a polling address in case a transmission request signal is not generated; and
(iii) outputting a moving request signal to said moving processing means, and repeating the step (b) of generating a polling AS signal by increasing a value of a polling address in case of receiving a response signal from said moving processing means.

4. A method of operating an arbitration switching system in a high-speed packet switching system with a parallel common bus, said method comprising the steps of:
(a) outputting a moving request signal to a moving processing means after initializing a polling address value of polling processing means as 0, and generating a polling address strobe (AS) signal;
(b) generating a source address latch signal outputting a response signal to said polling processing means, and detecting the state of an applied tag value after outputting a source AS signal and a reading signal in case said moving processing means receives a moving request signal from said polling processing means;
(c) processing a packet header in case a tag value corresponds to a start frame;
(d) effecting packet transfer switching in case a tag value corresponds to a continuation frame; and
(e) terminating packet transfer in case a tag value corresponds to an end frame,
wherein said step (c) comprises:
(i) outputting a latch signal from said length counting means and said destination address register, and checking whether a B bit or an M bit is set, and receiving and checking an SSID bit applied from a comparing means in case a B bit or an M bit is set;
(ii) writing its unique SSID value on an SSID bit by outputting a conversion signal to said header conversion means in case an SSID bit is 0; and
(iii) performing a packet erasure process since broadcasting or multicasting is completely finished in case a checked SSID bit indicates a correspondence signal.

5. A method of an arbitration switching system in high-speed packet switching system with parallel common bus type as claimed in claim 4, wherein said eleventh step comprising:
a twelfth step to output a length counter decrease clock signal to said length counting means, and to output a source AS signal and a reading signal, and to check an output of said length counting means; and
a thirteenth step to repeat a step of checking a moving request signal since the packet erasure process is completely finished in case an output of said length counting means is 0, and to repeat a step of generating a length counter decrease clock signal in case an output of said length counting means is not 0.

6. A method of operating an arbitration switching system in a high-speed packet switching system with a parallel common bus, said method comprising the steps of:
(a) outputting a moving request signal to a moving processing means after initializing a polling address value of polling processing means as 0, and generating a polling address strobe (AS) signal;
(b) generating a source address latch signal, outputting a response signal to said polling processing means, and detecting the state of an applied tag value after outputting a source AS signal and a reading signal in case said moving processing means receives a moving request signal from said polling processing means;
(c) processing a packet header in case a tag value corresponds to a start frame;
(d) effecting packet transfer switching in case a tag value corresponds to a continuation frame; and
(e) terminating packet transfer in case a tag value corresponds to an end frame,
wherein said step (d) comprises:
(i) outputting a destination AS signal and a writing signal to a common bus when a B bit or an M bit is not set, when an SSID bit is not equal to its unique SSID bit, when a header conversion process is already accomplished or when an analyzed tag indicates a COF (Continuation of Frame); and
(ii) outputting a length counter decrease clock signal to a length counting means, and then repeating step (b) of generating a source AS signal until a tag representing an OF (End of Frame) is applied.

7. A method of operating an arbitration switching system in a high-speed packet switching system with a parallel common bus, said method comprising the steps of:
(a) outputting a moving request signal to a moving processing means after initializing a polling address value of polling processing means as 0, and generating a polling address strobe (AS) signal;
(b) generating a source address latch signal, outputting a response signal to said polling processing means, and detecting the state of an applied tag value after outputting a source AS signal and a reading signal in case said moving processing means receives a moving request signal from said polling processing means;
(c) processing a packet header in case a tag value corresponds to a start frame;
(d) effecting packet transfer switching in case a tag value corresponds to a continuation frame; and
(e) terminating packet transfer in case a tag value corresponds to an end frame,
wherein said step (e) comprises:
(i) checking whether or not a value of a length counting means is zero;
(ii) perform an error process unless a checked value is zero; and
(iii) outputting a packet counter increase/decrease signal to a subscriber input/output means in case a checked value is zero, and then repeating a step of checking or moving request signal.

8. An arbitration switching system in a high-speed packet switching system with a parallel common bus, said system comprising:
a polling processor which outputs a moving request signal after receiving a transmission request signal, and which outputs a polling AS (Address Strobe) signal and a polling address after receiving a response signal responsive to a moving request;
a tag which outputs a signal representing a start/continuation/end state after receiving a tag signal;
a length counter which latches a LEN bit according to a latch signal, and outputs a counter value which is decreased according to a length counter decrease clock signal;

a header converter which writes its unique SSID on SSID bits with a conversion signal after latching a header field by a latch signal in case B bit and M bit are set, and which outputs converted header data;

a comparator which compares an SSID field with its unique SSID;

a destination address register which outputs a destination address by latching B bit, M bit and DA bit according a latch signal;

a source address register which transmits a source address by latching a polling address transmitted from said polling processor with the help of a latch signal; and a moving processor which outputs a control signal which is used for controlling header conversion and data transmission.

9. An arbitration switching system as in claim 8, wherein said header converter comprises:

a register which latches a header field of data with the help of a latch signal from the moving processor in case of multicasting or broadcasting;

a selector which writes its unique SSID bit on an SSID field within a header field by a conversion signal from said moving processor after receiving a header field which is latched in said register; and a buffer which outputs a converted header field by a header conversion part output enable signal of said moving processor thus providing a feedback process.

10. An arbitration switching method for use in a high-speed packet switching system with a parallel common bus, said method including the steps of:

(a) determining whether there is a first node of a plurality of nodes wanting to transmit a data packet or not by using a polling signal;

(b) by generating a moving request signal and receiving a response signal for said moving request signal if there is a first node wanting to transmit;

(c) repeating the steps (a) and (b) with a polling processor and receiving data packet data from said first node with a moving processor; and (d) processing said data packet data in response to a tag value in header information of said data packet data, including:

d-1) processing a packet header if said tag value designates a start of frame, including:
(i) providing a length counter and destination address register with a latch signal;
(ii) determining whether said data packet is a broadcasting signal or a multicasting signal by examining a header field of said packet data;
(iii) determining a source system identifier if said data packet is a broadcasting signal or a multicasting signal and performing step d-2) if not; and
(iv) performing header conversion, packet erasure or step d-2) in response to the value of said source system identifier;

d-2) performing packet transmission if said tag value designates a continuation of frame; and d-3) terminating packet transmission is said tag value designates an end of frame.

11. An arbitration switching method as in claim 10, wherein said step d-2) includes the further sub-steps of:
(i) providing a common bus with a destination address strobe signal designating the possibility of a second node's reception and write signal;
(ii) decreasing a length value of said length counter; and
(iii) repeating the above from said step (c).

12. An arbitration switching method as in claim 10, wherein said step d-3) includes the further sub-steps of:
(i) determining a length value of said length counter;
(ii) performing an error process operation if said length value is not zero; and
(iii) providing said first node or a second node with a packet counter decrease or increase signal respectively if said length value is zero.

13. An arbitration switching method as in claim 10, wherein said sub-step (iv) includes the further steps of:
iv-1) writing a source system identifier of said first node on SSID (source System IDentifier) bits if said source system identifier value of said SSID bit is said initial value;
iv-2) erasing said data packet if said source system identifier value of said SSID bit is said source system identifier of said first node, which means that broadcasting or multicasting transmission has been done; and
iv-3) transmitting said packet data if said source system identifier value of said SSID bit is neither said initial value nor said source system identifier of said first node.

14. An arbitration switching method as in claim 13, wherein said sub-step iv-2) includes the further sub-steps of:
iv-2-1) reducing the length value of said length counter;
iv-2-2) generating a source address strobe signal and read signal;
iv-2-3) determining the length value of said length counter whether said length value is zero or not; and
iv-2-4) repeating the above from said step iv-2-1) if said length value of said length counter is zero.

* * * * *